United States Patent [19]

Brody et al.

[11] 4,409,775
[45] Oct. 18, 1983

[54] APPARATUS FOR THE ASEPTIC PACKING OF HIGH ACID FOOD

[75] Inventors: Aaron L. Brody, Dunwoody, Ga.; William E. Archibald, Oklahoma City, Okla.

[73] Assignee: The Mead Corporation, Dayton, Ohio

[21] Appl. No.: 197,037

[22] Filed: Oct. 15, 1980

Related U.S. Application Data

[63] Continuation-in-part of Ser. No. 973,681, Dec. 27, 1978, abandoned, which is a continuation-in-part of Ser. No. 826,352, Aug. 22, 1977, Pat. No. 4,152,464.

[51] Int. Cl.³ .......................... B65B 3/02; B65B 55/10
[52] U.S. Cl. ......................................... 53/167; 53/426; 53/266 R; 53/382; 53/510; 134/73; 134/152
[58] Field of Search .................. 53/167, 266, 382, 426, 53/510; 141/92, 111; 34/105; 134/22.18, 73, 75, 152, 170; 422/27, 304; 426/399, 400, 401, 413

[56] References Cited

U.S. PATENT DOCUMENTS

| | | | |
|---|---|---|---|
| 2,638,964 | 5/1953 | Andina | 493/209 X |
| 2,710,818 | 6/1955 | Winters | 134/75 |
| 3,079,936 | 3/1963 | Hockett | 134/73 |
| 3,376,689 | 4/1969 | Simpson | 422/304 X |
| 3,574,952 | 4/1971 | Lee, Jr. | 34/105 |
| 3,650,088 | 3/1972 | Wilson | 53/167 X |
| 3,694,997 | 10/1972 | Christine | 53/167 X |
| 3,859,774 | 1/1975 | Rausch | 53/167 |
| 3,861,409 | 1/1975 | Taniguchi | 134/152 X |
| 4,014,158 | 3/1977 | Rausing | 53/167 |
| 4,061,152 | 12/1977 | Babunovic | 134/73 |

FOREIGN PATENT DOCUMENTS 1014014 12/1965 United Kingdom ................. 53/426

Primary Examiner—John Sipos
Attorney, Agent, or Firm—Erwin Doerr

[57] ABSTRACT

Apparatus for the aseptic packaging of high acid foods having a pH below 4.6 includes conveying means with carrier plate receptacles having orifices to receive preformed cups, the orifices being contoured to match the shape of the sealing flanges of the cups. The conveying means carries cups through a lock of liquid sterilant, past sprays that ensure against air pockets in the cups, through a bath of sterilant liquid in submerged, inverted position, lifts the cups from the bath and into a chamber of sterile inert gas, allowing liquid sterilant to drain therefrom, moves the cups in sequence to filling means and then to sealing means, where cover elements, presterilized from the liquid of the cup bath, dried and preheated, are applied to hermetically close the cups by the action of heat and pressure. Jets of the sterile inert gas, recirculated from the chamber, are directed at the cups after liquid sterilant has drained therefrom, so as to dry the sealing flanges of the cups. The interior of the machine is supplied with an atmosphere of pressurized sterile inert gas, such as nitrogen. After passing through a microbiological and inert gas barrier, ejection means removes the cups from the cup conveying means.

16 Claims, 13 Drawing Figures

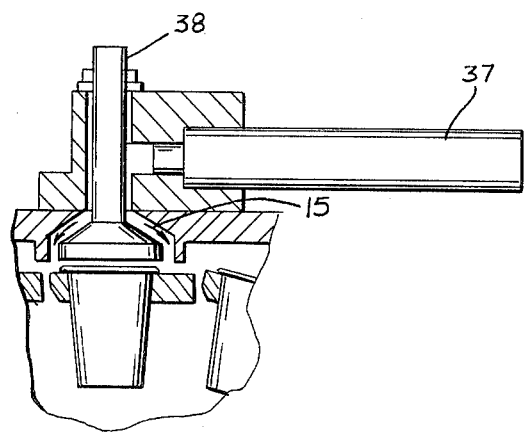
_Fig_ 8
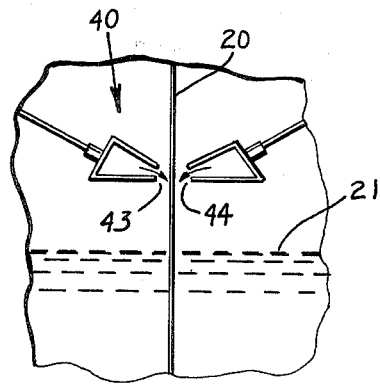
_Fig_ 9
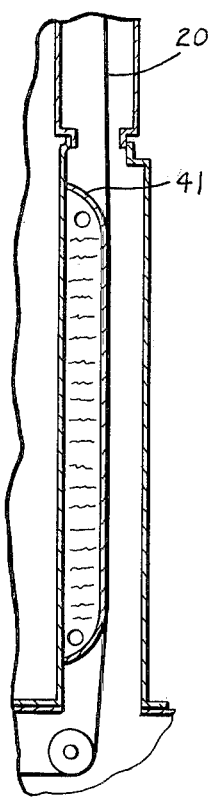
_Fig_ 10
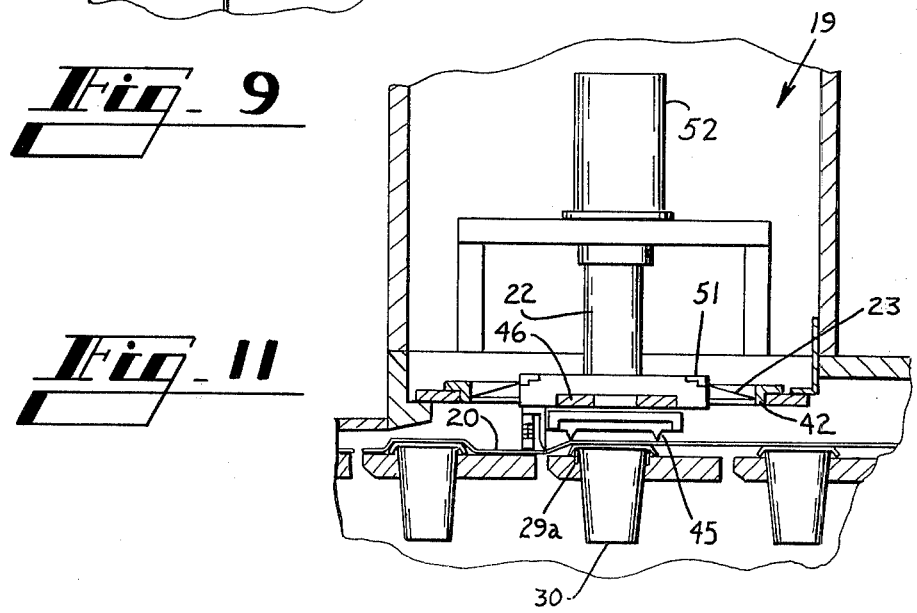
_Fig_ 11

APPARATUS FOR THE ASEPTIC PACKING OF HIGH ACID FOOD

RELATIONSHIP TO EARLIER APPLICATIONS

This application is a Continuation-in-Part of U.S. patent application Ser. No. 973,681, filed Dec. 27, 1978, now abandoned which in turn is a Continuation-in-Part of U.S. patent application Ser. No. 826,352, filed Aug. 22, 1977, now U.S. Pat. No. 4,152,464.

BACKGROUND OF THE INVENTION

This invention relates to apparatus for the aseptic packaging of high acid food products. More specifically, the present invention is directed to novel apparatus for carrying out a method whereby pre-formed oxygen and water vapor barrier plastic containers are sprayed with and immersed in an aqueous sterilizing bath at a temperature ranging from 212° F. to 140° F. for a time interval ranging from less than 1 second to 3.5 minutes, following which, after draining the sterilizing liquid therefrom, the containers are filled with pre-sterilized high acid food product in a sterile inert gas environment at or above atmospheric pressure and thereafter closed in the same sterile inert environment by sealing a dry sterile closure element thereto.

Although packaging of high acid food products for ambient temperature storage and distribution has been conducted in glass bottles and metal cans for many years, costs of these containers, their closures and labels have increased rapidly and are projected to continue to rise. Cost of thermoplastic materials has not increased as rapidly and are projected to increase at a lower rate than metal or glass. Further, these materials are more conserving of energy on a packaging and distribution systems basis. Therefore, packaging in thermoplastic materials represents a significant saving in packaging costs. Most packaging thermoplastics are oxygen permeable, and food packaging in such materials leads to higher cost of refrigerated distribution methods. Further, because of the heat sensitivity of most thermoplastics, conventional hot filling and terminal thermal sterilization techniques used commercially for cans or glass damage or destroy most thermoplastic packages capable of containing products under ambient conditions for prolonged periods. On the other hand, application of aseptic techniques would permit commercial sterilization of the packages under controlled conditions which leave the package unaltered and undamaged. As a further advantage of aseptic packaging, the product may be heated and cooled to achieve commercial sterilization outside of the package and thus very rapidly prior to packaging, and so is minimally altered by processing. A higher quality product results from the practice of this invention.

The high acid food products contemplated are those juices, fruits, vegetables and products having a pH of less than 4.6. Included are fruit juices, fruit juice drinks, fruit flavored drinks, nectars, jams, jellies, fruit syrups, catsup, tomato juice, tomato puree, tomato sauce, gelatin desserts, sauces and purees in fluid or semifluid form, and similar low pH dairy products such as fermented milk products, buttermilk, fresh cheese and yoghurt. Also contemplated are food products with a water activity greater than 0.85 and pH less than 4.6, such as whole, sliced and diced fruit, tomato products and formulated food products.

Aseptic packaging is employed for food products in order to permit a lower thermal input to achieve commercial sterilization and thus permit significantly higher quality products; to permit the use of packaging materials sensitive to heat; and to allow the filling of product into large containers which would otherwise require hours or days to cool. Aseptic packaging as used herein comprises commercial sterilization of food or other products external to and independently of the packaging; separate commercial sterilization of the packaging material; bringing them together in a commercially sterile environment; and hermetically closing them in a commercially sterile environment.

Because no terminal sterilization process is available to compensate for any errors or deviations in microbiological loading, viscosity, etc., every unit operation and unit of apparatus must be precise. Any casual application of equipment represents a potential entry access for microorganisms or air, both of which violate the integrity of the product. Further, aseptic packaging apparatus must be simple and not prone to interruption or breakdown, since any repair would require breaking seal integrity. All apparatus components must function at a high degree of reliability, permitting no entry of microorganisms or air, with no breakdown. All apparatus must remain functional while retaining commercial sterility.

Sterilization in the strict definition is an absolute: the absence of all microorganisms. Foods and analogous products are generally not sterile in the absolute sense. Rather, they are commercially sterile, a concept employed throughout industry and acceptable to regulatory authorities. Commercial sterility is the absence of microorganisms of public health significance and the absence of microorganisms capable of causing spoilage under normal conditions of distribution.

Aseptic and other packaging of most high acid products for ambient temperature distribution employs commercial sterilization procedures. Most high acid fluid food products are also highly sensitive to oxygen dissolved in the product and in the head space of packages. Hot filling used for most canning and bottling permits the presence of head space oxygen.

Commercial cold filling of high acid products makes no provision for removal of oxygen in the head space and generally obviates the problem by refrigerated distribution which reduces the rate of biochemical interaction of oxygen and product.

Chilled juice and other high acid packaged products minimize the problems of both microbial and oxygen presence by low temperature distribution which reduces the rate of microbiological propogation and the rate of biochemical reaction of oxygen and product.

In accordance with the present invention, the high acid food product is processed into the form (e.g. juice, sauce, puree, etc.) to be packaged, and is commercially sterilized prior and external to packaging by suitable means, as by heating. Thus the food product delivered to the aseptic packaging operation is essentially free of spoilage microorganisms, i.e., commercially sterile. The pre-formed plastic containers into which the commercially sterile food product is to be packaged require commercial sterilization before the food is placed therein.

Containers and their closures may be fabricated at a location remote from the food processing/packaging operation. While fabrication thereof is conducted under conditions of good manufacturing practice, opportunities exist for the contamination thereof by undesirable microorganisms which could cause spoilage of food packaged therein. Thus, the apparatus has the capability of commercially sterilizing the containers and their closures.

Another essential element of this invention is the reduction of oxygen virtually to extinction in the interior of the package, and the subsequent retention of the oxygen level to well below 1% of the head space volume in the sealed package. High acid food products such as fruits, fruit products and tomato products are susceptible to rapid loss of vitamin C, flavor and color by exposure to oxygen. In conventional canning practice for high acid food products, product is heated and filled hot prior to closure. For some products, a short high-temperature holding time is required. Cooling is required to arrest overcooking once the sterilization value has been achieved. Upon cooling, a partial vacuum of up to 22 in. Hg is effected through condensation of head space steam arising from the product. Products contained in cans and bottles thus packaged undergo oxidative biochemical changes due to the presence of occluded and dissolved oxygen in the product and of residual oxygen in the head space. The quantities of oxygen present in conventional practice are sufficient to oxidize the vitamin C naturally present, flavors and colors, and to render the product suboptimal and even unacceptable. To reduce the oxygen dissolved and occluded in the product, it is preferred that the product be treated as by centrifugation or vacuum prior to packaging.

The present invention requires that the filling and closing of the barrier plastic containers be conducted in an inert atmosphere such as sterile nitrogen to ensure that head space oxygen content after sealing is well below 1% by volume. By conducting the entire filling and closing operation in the absence of oxygen, a head space inert atmosphere is assured. Alternative conventional methods such as vacuum evacuation and replacement, or direct displacement by pressurized inert gas, both disturb the surface and do not ensure the absence of oxygen in the package. Further, this invention mandates that the packaging materials be composed of oxygen and water vapor barrier materials to minimize the quantity of oxygen and water vapor which can migrate through the walls of the package after closure.

PRIOR ART

Earlier proposals have been made for the aseptic packaging of high acid foods, and a variety of methods for sterilizing containers of various types are known. A number of these sterilizing methods use steam, e.g., Shields et al, U.S. Pat. No. 3,139,323 mixes acids such as hydrochloric acid with steam. Stewart, U.S. Pat. No. 3,839,843 uses acidified superheated steam for sterilizing. Other art is concerned with isolating the interior of the packaging apparatus from the outside atmosphere, to prevent air-borne contamination from entering. Simpson et al., U.S. Pat. No. 3,376,639 describes apparatus for canning beer in metal cans, using a plurality of sealing means to isolate the interior of the apparatus from ambient conditions. An earlier disclosure by Kronquest, U.S. Pat. No. 2,268,289 relates to apparatus for packaging fruit juices, but the apparatus described is only semi-automatic, and is specific to metal containers and rigid metal covers, all materials capable of withstanding elevated temperatures well above 250° F.

SUMMARY OF THE INVENTION

The present invention is directed to apparatus for the aseptic packaging of high acid foods having a pH of 4.6 or less with commercially sterile atmospheric pressure inert gas in commercially sterilized, pre-formed oxygen and water vapor barrier plastic containers. The head space in the filled package is totally contained with commercially sterile inert gas prior to sealing with a heat sealed closure element. The apparatus is fully automatic. As set forth in more detail hereinafter, preformed plastic containers are sprayed with and immersed in a recirculating aqueous sterilizing bath at a temperature ranging from 210° F. to 140° F. for a time interval ranging from less than 1 second to 3.5 minutes, following which, after draining the sterilizing liquid therefrom, the containers are filled with commercially sterilized food product and thereafter closed in an inert commercially sterile atmosphere by heat sealing a commercially sterilized closure element thereto. As part of immersion sterilization, the sterilant is agitated within the open container to preclude air bubbles or pockets that would interfere with sterilant heat transfer. Following immersion in the sterilizing bath and a downstream spray, the containers enter an inner section wherein all filling and sealing operations are performed in an atmosphere of sterile inert gas above atmospheric pressure. After sealing, the containers are conveyed through a continuous microbiological and gas barrier, such as an aqueous liquid sterilant curtain, which aids in setting the seal by decreasing its temperature, and which separates the commercially sterilized and inert interior part of the apparatus from the ambient atmosphere. Container ejection means then removes the sealed and completed packages from the apparatus.

BRIEF DESCRIPTION OF THE DRAWINGS

In the drawings,

FIGS. 3 to 13 show more specific detail of the presently preferred embodiment, whereby FIG. 3 is a diagram of a cup deposit device;

FIG. 4 is a sectional elevational view of the cup carrier plate and associated ring in which a cup is seated for conveying through the apparatus;

FIG. 5 is a diagram of the cup spraying system;

FIG. 6 is a diagram of the liquid sterilant skimmer for continuously removing floating particulate foreign matter from the liquid sterilant bath;

FIG. 7 is a device for reseating cups into their carrier plate rings;

FIG. 8 is a device for directing heated sterile inert gas on the flanges of the cups for the purpose of drying them in preparation of the heat sealing operation;

FIG. 9 is a diagrammatic sectional elevation of paired opposing inert gas knives for stripping excess liquid from the surfaces of a sterilized web of closure material;

FIG. 10 is a diagrammatic sectional elevation of an indirect heater to dry the web of closure material and preheat its sealant;

FIG. 11 is a diagrammatic sectional elevation of a heat sealer and shows a ring-shaped diaphragm which permits vertical movement of the heat sealer;

FIG. 12 is a flow diagram of liquid sterilant used to simultaneously act as an absolute barrier and to set the cup heat seal; and FIG. 13 is a diagrammatic sectional elevation of a liquid sterilant curtain providing a barrier between the interior and exterior of the apparatus.

DETAILED DESCRIPTION

Figure 1:
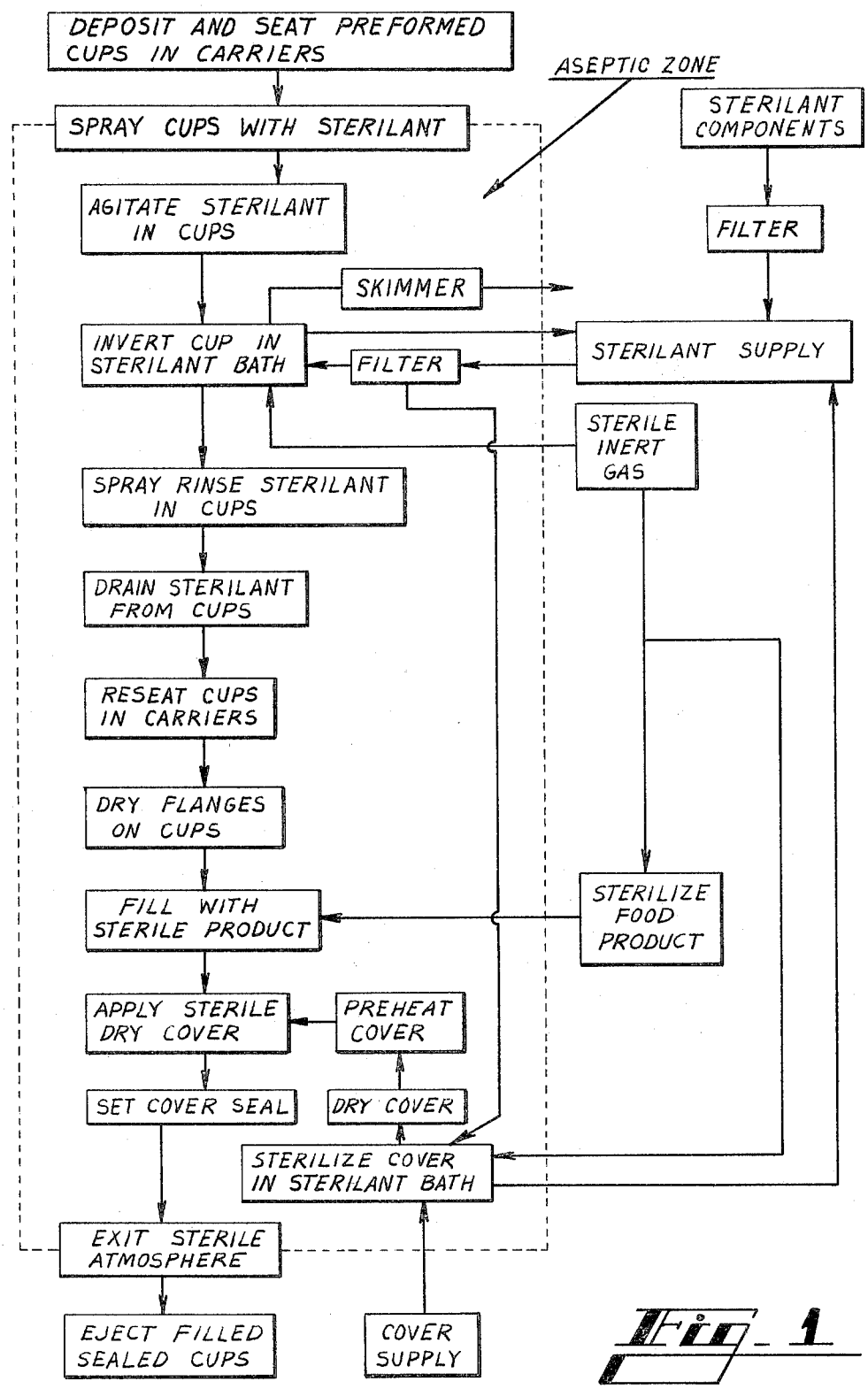
FIG. 1 is a flow diagram outlining the sequence of steps performed by the apparatus of this invention.

According to the invention, pre-formed plastic or plastic composite containers or cups are delivered to an infeed section of the aseptic packaging apparatus or machine. The pre-formed plastic containers can be produced at a remote location and delivered to the packaging operation. Cup bodies are formed from an oxygen and water vapor barrier thermoplastic by any convenient means, such as casting or sheet extrusion plus thermoforming from extruded sheet or film material sheeting plus vacuum metalizing plus cold forming, injection molding, blow molding, injection blow molding, compression molding, etc. There are several requirements for the plastic from which the cups are formed. The plastic must be an effective barrier to the transmission of water vapor. Most importantly, the plastic material must be an effective oxygen barrier at room temperature. The material must be non-toxic, and not permit the migration to the food of any unsafe indirect food additive. The material must be an effective barrier to the migration of flavors therethrough, and must not impart any undesirable flavor to the food products packaged therein. Additionally, a high heat distortion temperature is desired to allow greater latitude in selection of sterilization temperatures. Preferred materials are polyethylene terephthalate or its copolymers or copolymers of polyacrylonitrile with polystyrene with the polyacrylonitrile component amounting to 60 to 75% of the polymer, copolymers of polyacrylonitrile with acrylates; laminations or coextrusions of polyvinylidene chloride, polyvinyl alcohol, polyvinyl chloride or polyacrylonitrile as the barrier material with polystyrene, polypropylene or high density polyethylene as the structural member; metalized polyolefin sheet. Other materials and combinations of materials may be selected to give the desired properties to the pre-formed cups.

It is essential that the material selected be simultaneously a barrier material and capable of resisting commercial sterilization thermal conditions. Note that heat resistant formable materials such as high density polyethylene and polypropylene are poor barriers. Conversely, polyethylene terephthalate polyester is a good barrier but not capable of resisting thermal degradation without special pre-treatment and special fabrication techniques applicable mainly to this apparatus such as desiccation.

Containers such as plastic cups are delivered to the packaging machine and deposited in carrier plate receptacles in cup conveying means which serve to carry the cups through the sterilizing and packaging operations. Any skew cups that would result from gravity feeding could lead to jams and may require breaking sterility to clear the jam. Further, skew cups could interfere with filling and closure sealing. The cup conveying means carriers the cups in intermittent motion into, and inverts the cups in, a supply of liquid sterilant contained in a reservoir or bath. The cup conveying means includes a detachable carrier plate mounted on chains and designed as a receptacle for the cup, a floating, self-centering back-up for the heat sealer, a matching back-up plate for a contained heat seal plate to achieve top and side sealing on a container flange with adjacent concentric semi-horizontal and vertical sections. The semi-horizontal section is angled outward and downward from horizontal to achieve a taut hermetic seal closure. The vertical section is designed to hold the closure mechanically and thus reinforce the closure. The carrier plate is perforated to permit drainage of liquid sterilant after emergence from the liquid sterilant bath. Further, the carrier plate is designed for easy removal and replacement to permit easy and rapid container size change.

The amount of liquid sterilant in the bath is kept at a constant level and a constant temperature by direct injection of steam and is sufficient to immerse the cups completely during their passage through the sterilant bath.

In operation, the liquid sterilant is countercurrently circulated through the bath from a supply tank, and any dirt or foreign matter picked up by the liquid sterilant is removed by passing the liquid sterilant through suitable filters and/or other separators. Temperature of the sterilant is maintained by suitable heating means and thermal controllers, and is generally in the range of 140° F. to 210° F. In a preferred embodiment, temperature and level are maintained by direct injection of culinary steam. Liquid sterilant is circulated in a countercurrent manner so that, immediately after resterilization on each cycle, the liquid is entered into the outlet portion of the sterilization tank, and, exits from the container entry portion to return to the resterilization area and both particulate and microbiological filtration.

Direct injection of culinary type steam permits maintenance of level of liquid sterilant and temperature without adding make-up liquid which would have to be cleaned, filtered and sterilized prior to being entered. Culinary steam is, by definition, free of flavors and microorganisms and, of course, condenses to water. The composition of the sterilant may be water or water mixed with an organic acid, such as an organic acid obtained from natural sources, such as citric, malic, fumaric, succinic, tartaric, adipic or other acid derived from fruit products. The addition of an acid to the sterilant significantly enhances the microbicidal effect of the solution although it has been found that water alone, in the temperature range given above, is effective in killing or inactivating the microorganisms of concern within the exposure time permitted by economical operation of the apparatus. If an organic acid is used, however, the sterilant is adjusted to pH 1 to 4.

An important feature of the apparatus is the provision of a sequential series of jets or sprays arranged to send streams of liquid sterilant into the cups as the cup conveying means carries the cups downwardly into, through and out of, the liquid sterilant bath. The sprays are arranged so that liquid sterilant is directed into the cups prior to and during immersion in the liquid sterilant bath, with the provision that at least one such spray directs a stream of sterilant into the cups after immersion in the bath. This feature provides a pre-wetting action prior to immersion of the cups, while the submerged spray sweeps away any small air bubbles adhering to the inside of the cups. More importantly, the pressurized stream beneath the surface agitates the liquid sterilant within the cup to prevent the presence of air pockets which would, if present, prevent contact of liquid sterilant with the interior surfaces of the cup and thus prevent commercial sterilization. Also, if present, air pockets would retard heat transfer and further prevent commercial sterilization. Thus, the sub-surface spray agitation serves an indispensible role. The cleansing action of the sprays also serves to remove loose dirt or other contaminants from the interior of the cups.

The surface sprays alone are insufficient to accomplish commercial sterility since no assurance exists that the entire interior surface would be contacted by the liquid sterilant. Thus, immersion with provisions for complete intimate contact is required.

The surfaces of plastic containers are not wetted as readily as glass or metal surfaces, with a tendency for liquids to form a layer of discrete droplets on plastic surfaces. Interfacial surface tension of a solid and a liquid is measured by the contact angle between the liquid and the solid. Generally, for a droplet of liquid to spread on a flat surface, the contact angle must be less than 5°. Actual measurements of contact angle of distilled water or room temperature on clean polystyrene plastic is about 80° and on clean polyacrylonitrile polystyrene copolymer is 60°. Thus, using condensing steam or acidified steam for sterilization does not assure that there will be liquid contact over every element of the surface of the plastic, and either elevated temperature or prolonged treatment is necessary to accomplish sterilization. It appears that sterilizing time would have to be sufficiently long for thermal conduction of heat from droplet covered areas to adjacent unwetted areas in order for sterilization to be effective.

In any event, the present sterilizing method whereby cups are treated with sterilant sprays both before and after immersion in a bath of sterilizing liquid avoids any problems of incomplete wetting from condensing vapor. That applicants' method is effective is shown by the short time requirements at relatively low temperature to accomplish as much as an eight decimal reduction in the number of microorganisms surviving the sterilizing treatment.

Another important feature is that the immersion bath serves as a liquid lock that prevents the entry of microorganisms or air into the commercially sterile interior of the apparatus where aseptic packaging functions take place. The liquid sterilant thus serves to sterilize, to maintain sterility, and to maintain an inert atmosphere. Further, the liquid sterilant bath also permits a slight overpressure of inert atmosphere within the commercially sterile chamber by functioning as a pressure leg, thus obviating the need to operate under vacuum with its potential for drawing in air and air-borne microorganisms as well as creating conditions within sealed cups that might lead to sidewall collapse after filling and sealing.

Another important aspect of the use of a bath of liquid is that this constitutes an absolute barrier to the entry of microorganisms and air and to the discharge and loss of inert atmosphere. This is in contrast to an air curtain, where the air flow may be disrupted by the movement of objects such as cups or chains through the air curtain, which could permit interchange of the interior of the chamber with the external atmosphere. The use of mechanical locks which are absolute barriers, however, would require elaborate physical mechanisms and intermittent sterilization devices which are both slow and subject to severe maintenance problems.

The interior of the system is maintained at slight positive pressure of inert atmosphere to ensure against entry of microorganisms or outside air through any minute leaks in the system apparatus.

Another important feature of the immersion bath is that not only are the cups exposed to the commercial sterilization effect, but so also are the chains, conveyor, cup carrier, etc. Each of these is exposed to the external contaminated atmosphere on each cycle during operation and must therefore be sterilized on each cycle to prevent contamination of the commercially sterile interior of the apparatus.

Furthermore, by coating all the working mechanical surfaces, the liquid sterilant also functions as a lubricant for chain and sprockets, drive sprocket, etc., i.e., all interior working parts. Thus, no other lubricant is required such as oil which would interfere with intimate contact of liquid sterilant with the cup or which might contaminate the cup and hence ultimately the product.

Following completion of the sterilizing step, the cup conveying means move upwardly out of the sterilant bath into an enclosed sterile space containing a sterile inert gas, such as nitrogen. A final spray of liquid sterilant directed into the inverted cups removes any remaining foreign material adhering to the interior. Liquid sterilant is then permitted to drain by gravity from the interior of the cups. If desired, jets of sterile gas may be directed into the cups to remove any small amount of sterilant which may be adhering to the surfaces thereof.

After the cups have drained, the conveying means passes around guide means which turns the cups to an upright position. Although a continuous passive retaining rod is employed to ensure that the cups do no unseat themselves from their carriers during conveying, it is possible that an occasional cup might come loose. To accomplish a tight interference fit between the contoured heat sealer face and the identically contoured cup flange and the identically contoured back-up plate, it is essential that the cup be perfectly seated in the carrier. Since the cups have been conveyed inverted and have been righted and since it is possible that a cup may occasionally be loosened, a mechanical reseating device is provided within the commercially sterile interior, comprising a cantilevered spring loaded set of free spinning rollers which are as wide as the cup diameter and are positioned immediately above the cup flanges as they reach the horizontal attitude. Should any cup be out of position, this device gently and continuously guides it back into position in the carrier with the cup flange firmly against the cup back-up.

Heat sealing of closure to the cup might be interfered with by the presence of liquid sterilant on the cup flange surface. Thus, it is desirable to ensure that the cup flange surface area is clean and dry. Since the cup is within a sterile enclosure of an inert atmosphere, it is necessary to achieve this drying step while maintaining sterility and an inert atmosphere. Further, we have learned that although the interior of the chamber is at elevated temperature, this heat is not sufficient to effect the requisite drying. On the other hand, exposure to massive circulation of heated gas would result in agglomerating bubbles on surface areas. For this reason, a specifically directed drying means is incorporated.

Commercially sterile inert gas of pressure slightly above atmospheric is withdrawn from the enclosure and pumped through an indirect heater to elevate the temperature of the sterile inert gas and to reduce its relative humidity so that it may function as a drying agent. This high temperature, commercially sterile, dry inert gas is then blown through as inverted cone that discharges the gas directing it solely at the flange areas. In this manner, dry gas both causes physical removal of any residual liquid sterilant from the flange areas by blowing it off or causing it to bead and drain away from the flange, and also heats any liquid sterilant that might be in the flange area and thus causes its evaporation. No other portion of the cup is heated to prevent any residual heat to be transmitted to the product at the filling station thus causing thermal degradation damage to the product. Further, by minimizing exposure of the cup to the heat, the possibility of thermal distortion of the thermoplastic material is eliminated.

Further conveyor movement carries the cups to filler means, where presterilized and cooled food product is metered into the cups. Ideally, the food product is sterilized by very short exposure to high temperature (flash heating in less than 30 seconds) followed by rapid cooling. This method of rapidly sterilizing and rapidly cooling the food product has a minimum effect on the flavor thereof while still permitting the requisite microbicidal effect. However, other methods of sterilizing the food product may be used so long as the product supplied to the filler means is commercially sterile. Essential to aseptic packaging of the present invention is that product temperature be below ambient as, for example, at 35° F.

In an aseptic packaging operation, filling must be performed under commercially sterile conditions in a manner in which product is accurately, precisely and expeditiously filled while not in any way contaminating or otherwise disrupting the closure area in a manner that might interfere with sealing. Further, filling should be accomplished under atmospheric or above atmospheric conditions to obviate the extreme difficulties that arise in attempting to move fluids under vacuum.

The conveying means in this apparatus operates intermittently, permitting stops that allow for operations such as filling. Because the cups are filled with liquid or fluid at the filler, it is essential that the start and stop procedures be such that no spillage or overflow occurs due to too rapid acceleration or deceleration as such spillage would contaminate the flange areas. A drive providing an intermittent sinusoidal motion is preferred. In addition, to ensure that no spray or splashing occurs and that no drippage occurs, which could contaminate the flange area, a positive displacement bottom-up filler with positive cut-off at the nozzle and capillary suck back may be used although, of course, other fillers having the same functional characteristics might also be employed. As previously explained, filling is effected in an atmosphere of sterile inert gas such as nitrogen at or slightly above atmospheric pressure.

The filled cups are closed by heat sealing a cover element thereto. The cover elements are fed into the machine in the form of a web of heat sealable flexible material which is passed through a commercial sterilizing operation such as immersion in a bath of heated liquid sterilant. Since it is more economical to use the same heated liquid sterilant to treat both cups and closure material, the two baths may be suitably interconnected. Because of the presence of a thermally sensitive sealant on one face of the web, the unwind mechanism is designed so that only the other or back side of the web comes into contact with the rolls.

As with the cups, it is necessary to ensure that the seal area of the cover elements be free from residual liquid that might otherwise interfere with sealing. The web emerges from the bath into commercially sterile inert atmosphere chamber or enclosure. A small portion of commercially sterile inert atmosphere is withdrawn from the chamber and preferably is heated to reduce its relative humidity and increase its evaporative capability. This portion is split into two streams which are blown onto both surfaces of the web in the manner of two downwardly directed opposing air knives. Excess liquid sterilant is physically blown downward back into the liquid sterilant immersion bath leaving the web closure elements essentially dry. In addition, the web of cover elements is drawn tautly over a steam-jacketed or otherwise heated indirect heater with intimate contact being effected between the heat conductive wall of the heater and the back face of the web. In this manner, heat energy is transmitted to evaporate any residual liquid sterilant. Simultaneously the heat sensitive sealing material on the opposite or sealing face is increased in temperature as a preheating step for the heat sealing operation.

To ensure an operable and peelable closure, temperature of heat sealing must be sufficiently high to ensure bonding of the two surfaces. On the other hand, extremely high temperature so as to fuse the base similar materials would result in a uniform weld which would be as strong or stronger than the base material and thus virtually impossible to part or open. For this reason, weld sealing is not acceptable in most instances for commercial food products.

Heat sealing of two dissimilar materials requires elevating the temperature of the sealant sufficiently to render it tacky within a brief time, and adhering it to the other packaging material and then reducing the temperature to set the seal. Heating of the sealant requires thermal control to ensure tacky condition without flow that would remove sealant from the surface. Many heat sealers employ high temperature bars, etc., on the back of the material to drive heat through the material and activate the sealant. However, such high temperatures may damage the base material. On the other hand, too low temperatures might not permit sufficient time for activation. Thus, another facet of this invention is to preheat the sealant by the indirect heating that also completes the drying of the closure web.

The dry preheated web is delivered to overlie the filled cups. Printed material may be registered in position by photoelectric sensing of location followed by mechanical adjustment, or by employing material that has been provided with a registration opening that engages a pin on the carrier plate. Heat and pressure to seal the cover to the cup are applied, and the cover is then severed from the web by die elements which are preferably associated with the heat sealing element. If desired, the individual covers may be partially cut from the web of cover elements prior to application to the cup.

The flexible heat sealable cover material may suitably be a laminated web of metal foil and plastic film which carries a layer of heat activated sealant on one side thereof, or an equivalent lamination or coextruded material. The sealant is selected to give tight leak-proof hermetic bonds to the material used for making the cups.

To obtain properly sealed cups, it is important that the heat sealing head is shaped to conform with the flange area, and that the latter is supported on a mating self-adjusting back-up ring. The heat sealing head is preferably made of a resilient material so that any imperfections in either the cup flange or the closure material may be compensated and is adapted to provide increasingly uniform pressure as it draws the material over the cup flange to effect the heat seal. The contoured shape of a resilient material such as silicone rubber meets these criteria. With preheating of the cover material, the thermal driving force to the closure material is sufficient to activate the sealant. The contoured shape of the sealing head has the effect that the cover material is drawn down gradually over the outer perimeter of the cup, thus tightening the top portion of the cover material and smoothing it immediately prior to contact from the interior portion of the heat sealer. The use of the floating back-up ring in which the cup is seated ensures that the heat sealing device centers on the cover and cup, even if a minute locational discrepancy arises. For a more detailed description, reference is made to the co-pending patent application Ser. No. 069,945 filed Aug. 27, 1979 and assigned to the assignee of the present application.

Heat sealing is performed by a unit that reciprocates up and down. After sealing, the unit moves up to permit the sealed cup to be conveyed away. Any movement of a rod of shaft into or out of the commercially sterile area could result in breaking sterility. Also, actuation mechanisms such as motors or hydraulic or pneumatic cylinders cannot be placed within the chamber as they would not be accessible for maintenance and repair, they would be in a variably humid environment and would function erratically, and, in the case of pneumatics or hydraulics, would be prone to discharging of unwanted fluid. Actuation therefore must be external to the commercially sterile inert area. On the other hand, the heat sealer head must be within the commercially sterile area. While it is known to effect separation of the two by a membrane, the disadvantage is that such a membrane acts as a thermal barrier and interferes with the heat sealing.

In the present invention, separation of the heat sealer head from the exterior is effected by a ring-shaped flexible diaphragm affixed on the interior to the outer periphery of the moving heat sealer and affixed along its outer perimeter to an opening cut into the wall of the chamber. This flexible member completely closes off the opening in the chamber while permitting vertical reciprocating movement of the heat sealer. By minimizing the surface area of the ring and its vertical movement, only a minute internal gas pressure increase or fluctuation is effected by the reciprocating action, and so the level of the liquid sterilant is not significantly affected and the possibility of sucking microorganisms and air through openings by the transient vacuum or differential pressure generated is obviated.

After completion of the closure operation, the sealed packages are passed through a seal or lock which prevents microbial contamination and entry of oxygen into the interior of the machine as well as prevents loss of inert gas from the interior of the machine.

Another important facet of this apparatus is in that it provides means for the setting or making permanent of the heat seal by removal of heat from the seal area once the bond has been effected. Any one of several means could be employed including a second bar, chilled, impingement of cold gas, or spraying of cold liquid. In this apparatus, however, cooling is preferably accomplished by the liquid sterilant curtain, the primary function of which is to serve as a microbiological and gas barrier at the discharge end of the apparatus. To this end, a portion of liquid sterilant is withdrawn from the circulating stream of sterilant and is diverted through a heat exchanger wherein the temperature of the liquid sterilant is decreased from sterilization temperature to below 100° F. This cooled liquid sterilant is then employed as the liquid in the curtain that showers down and thus forms the gas and microbiological barrier. Upon completing its function, the liquid sterilant is immediately recirculated to a reheat area to be resterilized since portions have been exposed to the air.

Ejector means removes the cups from the carrier plate receptacles, and the cup conveying means returns to the point at which the pre-formed cups are fed into the machine, and the operating cycle is repeated.

The various operations described above are shown in diagrammatic form in FIG. 1. Note that the steps inside the dotted line are carried out under commercially sterile inert atmospheric conditions inside the packaging apparatus. Also, the entire internal structure of the packaging apparatus is pre-sterilized as by steam or hot water prior to the start-up of food packaging operations. Various features of the apparatus are shown in more detail in FIGS. 2 through 13 and explained in the description which follows.

Figure 2:
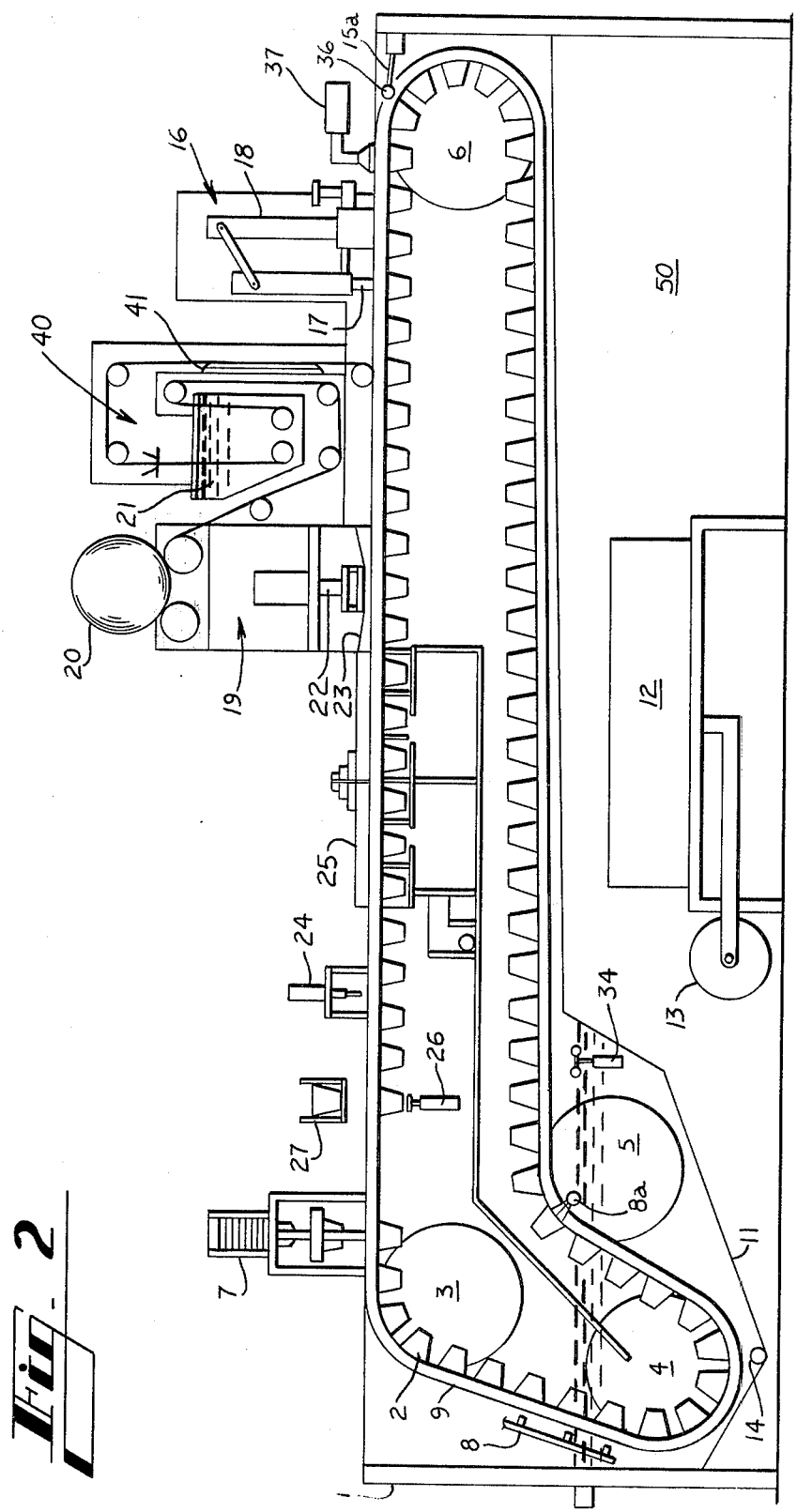
FIG. 2 is a diagrammatic sectional elevational view of one embodiment of the invention.

Referring to FIG. 2, the aseptic packaging apparatus of this invention is generally identified by 1, and is enclosed by a hood or shroud which protects the interior thereof from outside ambient air. The liquid sterilant baths and the liquid sterilant curtains comprise the remainder of the aseptic enclosure separating the interior of the machine from the environment. Located inside the machine is a cup conveying means 2, which is composed of a series of orifice carrier plates connected together to form an endless belt. Cup conveying means 2 passes around a series of drive and guide sprockets 3, 4, 5 and 6 so that the cup conveying means can move the cups through a sequence of machine operations as set forth below.

Figure 3:
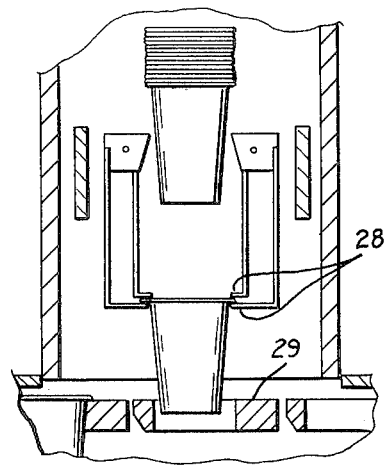

A supply of pre-formed cups in nested or magazine form is provided as indicated at 7, the cups being positively delivered in timed sequence into orifices in the carrier plates of the cup conveying means 2. As indicated in FIG. 3, the cup flanges are firmly grasped by grippers 28 whereafter the grippers 28 move downwardly to deposit the cup into carrier plates 29 of the cup conveying means 2. While the grippers 28 are moving downwardly, a retaining device holds the remaining cups in position. At the bottom of the stroke, the cup is released by the grippers 28 to be seated in the orifices in the carrier plates 29 of the cup conveying means 2. The orifices are preferably fitted with insert rings secured in the carrier plates, permitting the rings to be easily changed for different cup sizes. The orifices or rings are shaped to conform to the shape of the flanges of the cups so that the cups are firmly retained in the carrier plates. The carrier plates also contain drain holes.

Figure 4:
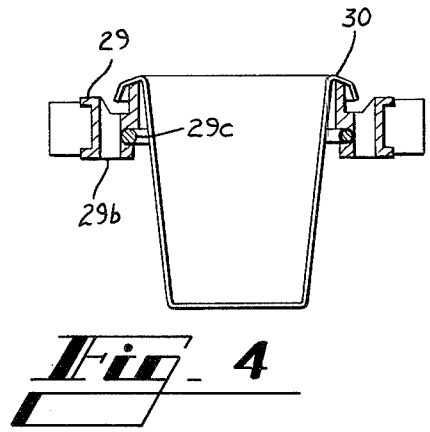

FIG. 4 is a cross-sectional view of a typical carrier plate 29 with cup 30 seated in the carrier ring 29a and drain holes 29b provided in carrier plate 29. The carrier ring is supported on an O-ring 29c of resilient material to render the ring self-adjusting.

As will be understood from a reference to FIG. 2, the carrier plates 29 carry the cups around guide sprocket 3 into a generally downward path of travel. As the cup conveying means 2 travels around sprocket 4, the cups are turned to an inverted position. Cup retainer rail 9 is disposed along the path of travel of the cups through this portion of the machine to prevent cups from falling out of the orifice carrier plates while inverted. Continuing downwardly toward sprocket 4, the cups are carried past a series of sterilant sprays 8 arranged above and below the surface of liquid sterilant 10, contained in sterilant tank 11.

Figure 5:
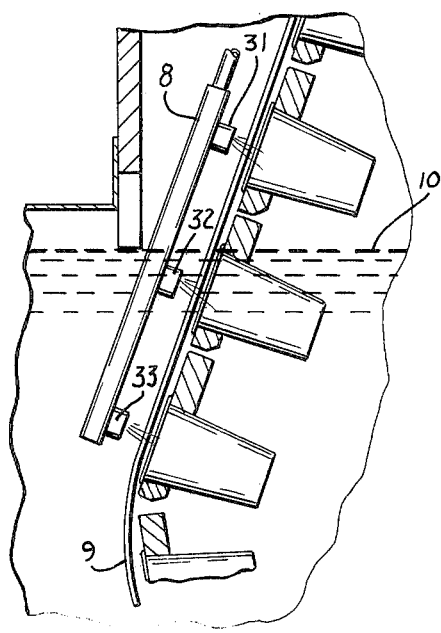
Figure 6:
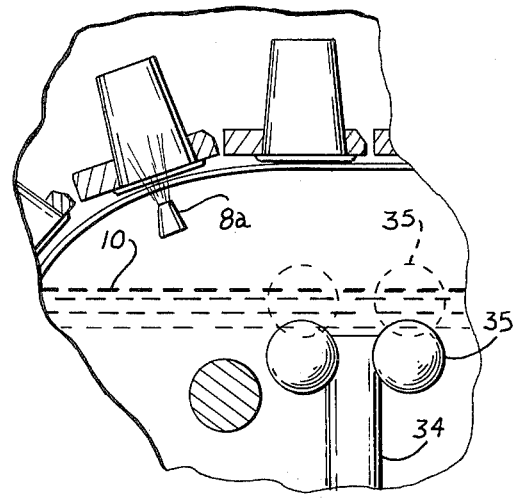

FIG. 5 shows the cups as they pass by sterilant sprays 8 of which sterilant sprays 31 and 32 are above or at the level of the liquid sterilant 10 and spray 33 is below the level. Sterilant sprays 31 and 32 are arranged so that liquid sterilant is directed into the cups as the cups approach the sterilant bath. This provides a per-wetting action, and serves to loosen or dislodge dirt or other surface contamination from the cups. Spray 33 is located below the surface of the sterilant bath and provides a flushing action to sweep dirt and contaminants away, to ensure complete liquid contact or wetting of every elemental area of the cup interior, to remove air and to eliminate air pockets within the cups. Another sterilant srpay 8a (FIG. 2) is located subsequent to the sterilant bath at the point where the cups emerge from the bath and ensures removal of any remaining foreign material.

The supply of sterilant in tank 11 is maintained at a temperature in the range of 140° F. to 210° F., and the speed of travel through the liquid sterilant bath is adjusted so as to keep the cups immersed for a period of from 1 second to 3.5 minutes. Fresh liquid sterilant is supplied to tank 11 from the reservoir 12 located outside the machine, and the sterilant in the machine tank 11 is continuously recirculated through filtering and heating means (not shown) to maintain the temperature and cleanliness thereof. Pump 13 supplies clean recycled liquid sterilant to sprays 8 and 8a, and machine tank 11. Alternatively, temperature of sterilant 10 in tank 11 can be maintained by direct injection of filtered culinary-type steam into the tank. This method of heating also provides make-up liquid by reason of steam condensation.

Within the liquid sterilant tank 11 is a skimmer 34 (FIGS. 2 and 6) whose upper flotation position 35 is maintained level with the surface of the liquid sterilant 10. The skimmer 34 acts as a liquid lock overflow to a drain (not shown) and causes the overflowing liquid to carry with it floating foreign matter and thus serves as a primary filter to maintain the cleanliness of the liquid sterilant.

Following passage through the sterilant bath, the cups travel upwardly around guide sprocket 5 past post-emergence spray 8a and then generally in a horizontal path to guide sprocket 6. Sterilant drains from the inverted cups during this portion of their travel through the machine. Liquid sterilant so drained flows back into the liquid sterilant tank. The enclosed portion of the machine is filled with a commercially sterile inert gas such as nitrogen at atmospheric pressure or above, which gas is passed through one or more microbiological filters such as "Millipore" filters, and introduced into the interior of the machine through the bottom portion of sterilant tank 11 as indicated in FIG. 2 at 14. Passage of the inert gas through the sterilant bath serves to ensure sterility of the inert gas, provides a mixing action to the sterilant in the machine tank and humidifies the gas. If desired, jets of commercially sterile inert gas may be directed inside the cups during this portion of their travel to sweep remaining traces of liquid sterilant therefrom.

Figure 7:
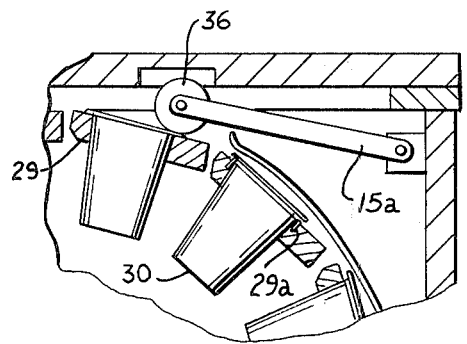

After the cup conveying means travels around sprocket 6 turning the cups to an upright position, the cups pass beneath a reseating device 15a to ensure that the cups are properly placed within the carrier plate orifices. FIG. 7 shows such a reseating device comprising a spring-loaded roller 36 which, if necessary, gradually pushes the cup downwardly to reseat the same into the cup carrier ring 29a to ensure tight fit of the flange of the cup 30 on the carrier ring.

The cups then pass gas jets 15 which are arranged to eject an inverted cone of gas downwardly in a circular pattern directly to the sealing rim or flange areas of the cups to ensure that the cup flange sealing areas are dry and free of liquid sterilant which might interfere with the later sealing operation. These gas jets may be supplied by recirculating a portion of the inert gas from within the housing through an indirect heating element. As shown in FIG. 8, the gas is passed through an indirect heater 37 and delivered through an inverted conical spreader 38 to eject heated commercially sterile inert gas directly onto the cup flanges beneath.

The cups then pass on to filler station 16, where filler nozzle 17 delivers a metered amount of food product into each cup. Nozzle 17 is supplied by conduit 18 with presterilized food product. Filler 16 and its associated parts are designed to deliver food product into the cups without splashing or spraying of the food, and without contaminating the sealing flange or rim of the cups with particles or droplets of food product. An example of a suitable filler is disclosed in U.S. patent application Ser. No. 017,614, filed on Mar. 5, 1979 now U.S. Pat. No. 4,235,265 and assigned to the assignee of the present application.

The cup conveying means next carries the cups to a sealing station, indicated generally at 19. A web of cover material 20 is passed through a sterilant bath 21 and into proximity above the flanges of the cups. Upon emerging from sterilant bath 21, web 20 passes into a commercially sterile inert gas area and past an inert gas knife 40. FIG. 9 shows the inert gas knife with the web emerging from the surface of the liquid sterilant bath 21. Slots 43 and 44 are located adjacent to the path of the web and are supplied with commercially sterile inert gas taken from the interior of the machine to blow excess liquid sterilant back into the sterilant bath 21.

The web is conveyed tautly over heated plate 41 which imparts evaporative heating while simultaneously preheating the heat sealant. FIG. 10 shows the web heater with web 20 being drawn over the indirectly heated plate 41.

Sealer 19, operating heat sealing element 22, applies the cover material to the top of the filled cups and seals the covers thereto by the action of heat and pressure. Reciprocating vertical movement of the sealing element 22 is permitted by flexible, ring-shaped diaphragm 23 which acts as a part of the machine housing, and preserves the sterile oxygen-free atmosphere of the interior of the machine. FIG. 11 shows diaphragm 23 secured to the periphery 42 of the opening in the housing through which the sealer operates. The diaphragm 23 bridges the opening, and is secured to the outer periphery 51 of sealing element 22. As further illustrated in FIG. 11, the heat sealing element 22 comprises an actuating mechanism 52 adapted to drive the sealing face 45 downwardly to the cup and retract it subsequent to sealing and a heating element 46 such as an electrical resistance heater or circulating hot oil device, face 45 being of resilient material molded to conform to the shape of the flange of cup 30 and its floating back-up ring 29a. The heated contour-shaped resilient sealing face 45 descends upon the cup flange with the cover material 20 between the cup and the sealing face. The cover material is drawn down the sides of the cup flange making bond contact and drawing the material 20 tautly over the opening. At the bottom of its travel, sealing face 45 presses firmly against the cover material 20, making intimate contact with cup flange 30 while applying pressure and effecting a heat seal.

If desired, the cover element may be cut to the desired shape of the cup and waste material can be stripped from the cups by die-cutting and stripping means 24, the waste material, still interconnected, passing out of the machine and being wound into a roll for easy disposal. Alternatively, the cover web may be pre-cut into strands of interconnected covers prior to delivery to the machine, and, following the sealing operation, merely cut apart, thus eliminating any stripping of waste cover material from the filled and sealed cups. Note that cutting means 24 may be located immediately following sealing means 22, or, as shown in FIG. 2, may be spaced therefrom and follow after the cups have moved past a microbiological and inert gas barrier 25.

Figure 12:
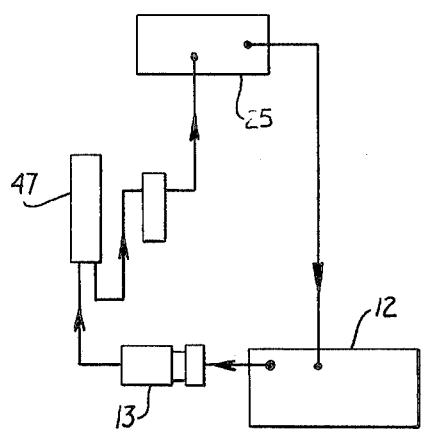

The barrier 25 may suitably be a water or liquid sterilant curtain, which separates the interior, commercially sterile, part of the machine from the ambient air. Preferably, the liquid sterilant for the curtain is taken from the sterilant reservoir 12, passed through a heat exchanger 47 and delivered to the sterilant curtain 25, as indicated in FIG. 12. The purpose of the heat exchanger is to lower the temperature of the sterilant so that the latter may serve also as a coolant to reduce the temperature of the seal areas of the cups as they move through the liquid curtain and thus help to set the seals. An example of a preferred arrangement for the liquid sterilant curtain is disclosed in U.S. patent application Ser. No. 156,279 filed June 4 1980 now abandoned and assigned to the assignee of the present application.

Figure 13:
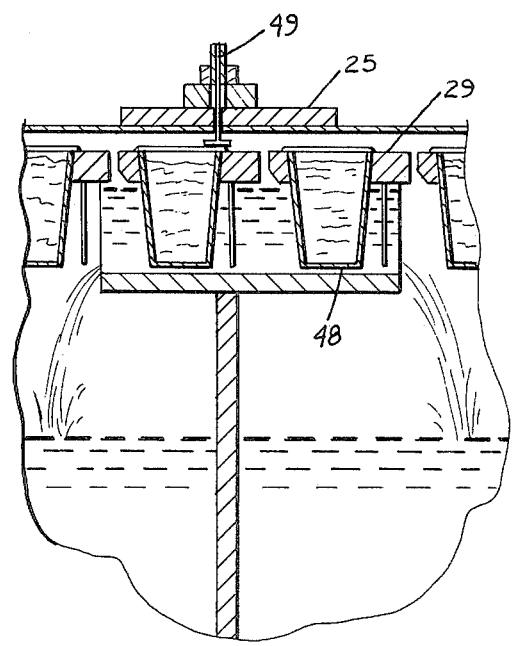

FIG. 13 shows the liquid sterilant curtain 25 with filled sealed cups 48 in their carrier plates passing through a downwardly descending shower of cooled liquid sterilant 49 from the commercially sterile inert region of the apparatus into the air.

The cup conveying means next carries the filled finished cups to an ejection mechanism indicated at 26 where cups are displaced from the cup conveying means and removed from the machine as shown at 27. Thereafter, the cup conveying means completes its travel and returns to cup supply means 7. While not shown, it will be understood that sinusoidal drive means for the cup conveying means may be conveniently located in the lower portion of the machine as indicated at 50. Note that motion of the cup conveying means is intermittent, and is synchronized with the operation of filler means 16, sealing means 19, cutting means 24, and ejection means located at 26.

The apparatus as a whole or at least vital parts which are disposed within or enter the enclosure are constructed of stainless steel to facilitate clean-up, permit per-sterilization and prevent corrosion. However, for vegetable and other high acid products which require the packaging materials to be sterilized at a pH below 2, the acid content of the sterilant might react with equipment components and alter the pH. For such applications, the cup carriers, chains, sprockets and drive shafts would be constructed of non-metallic materials that are not readily corroded by the acidic conditions, for example ultra-high molecular weight polyethylene or acetal of the type known under the trademark "Delrin".

Although several embodiments of the invention have been described herein, it is apparent that changes and modifications can be made to the apparatus disclosed herein without departing from the scope of the invention, as defined in the following claims.

We claim:

1. In an apparatus for the aseptic packaging of food in pre-formed plastic cups and including conveying means for carrying said cups through a bath of sterilizing liquid whereby said cups are inverted and immersed in a bath of sterilizing liquid, removed therefrom and said liquid is allowed to drain from said cups and said cups are turned to an upright position, drying means for removing residual sterilizing liquid from the flange sealing areas of said cups, filling means for adding pre-sterilized food to said cups, cover element delivery means for supplying a cover element to each of said cups, sealing means for heat sealing said cover element to each of said cups, ejecting means for removing said cups from said conveying means, the improvement wherein (a) said conveying means comprises carrier plates joined together to form an endless belt conveying means for carrying said cups through said apparatus and having orifices for receiving said cups, said orifices being shaped to conform with the shape of the cup sealing flanges, (b) multiple spray means located at a point where said cups are submerged in said bath of sterilizing liquid, said spray means mounted at fixed location above and below the surface of said sterilizing liquid in said bath and arranged to spray liquid into said cups to prevent formation of air pockets or bubbles in said cups, (c) said drying means comprises jets of sterile inert gas directed at the sealing flanges of said cups and being located downstream from the point where said cups emerge from said sterilant bath, (d) said drying, filling and sealing means are located inside an enclosure means having means for introducing inert gas into said enclosure means, said enclosure means arranged to maintain an interior atmosphere of sterile inert gas at a pressure slightly above atmospheric pressure, and (e) microbiological barrier means is provided following said sealing means, said barrier means serving to separate the interior of said enclosure means from the outside atmosphere and comprising a curtain of liquid sterilant effective to maintain the sterility of the atmosphere inside said enclosure means.

2. The apparatus according to claim 1 wherein said means for introducing inert gas into said enclosure means comprises means for passing said gas through said sterilizing bath, said gas providing a mixing action to the sterilant liquid in said sterilizing bath.

3. The apparatus according to claim 1 wherein said sterilant bath is provided with means for controlling the temperature thereof, including means for injecting culinary-type sterile steam into said bath, the condensation of said steam also serving to maintain a constant liquid level in said bath.

4. The apparatus according to claim 1 wherein said heat sealing means comprises a reciprocating element extending into said housing and disposed to reciprocate in a vertical direction, movement of said reciprocating element being permitted by a flexible diaphragm forming a portion of said enclosure means and being attached to the periphery of said reciprocating element to permit reciprocating motion of said heated sealing element while maintaining the sterility of the interior of said enclosure.

5. The apparatus according to claim 1 wherein said cover elements are provided in the form of a web of cover material, further comprising a second bath of liquid sterilant wherein said web is temporarily immersed prior to entering into the sterile enclosure means.

6. The apparatus according to claim 5 further comprising jets of sterile inert gas directed to said web after it emerges from said second bath to remove residual sterilant liquid from said web and means for drying said web and preheating the sealant carried on one side of said web.

7. The apparatus according to claim 6 wherein said jets are supplied with sterile inert gas taken from the interior of said enclosure means.

8. The apparatus according to claim 5 further comprising means for supplying liquid sterilant from a reservoir to said bath and said second bath and to said multiple spray means and to said liquid curtain.

9. The apparatus according to claim 8 further comprising means for reducing the temperature of the liquid sterilant portion to be supplied to said liquid curtain to serve as coolant for setting the heat seals on said cups as they move through said liquid curtain.

10. The apparatus according to claim 1 wherein said carrier plate orifices are fitted with carrier rings shaped to conform with the shape of the cup sealing flanges for supporting said cups and mounted to be self-adjusting.

11. The apparatus according to claim 1 or claim 10 further comprising means for re-seating loose cups in said carrier plates after the cup emerge from said bath of sterilizing liquid.

12. The apparatus according to claim 1 wherein the sterile inert gas for said drying means is taken from the interior of said enclosure and dehumidified and heated.

13. The apparatus according to claim 5 wherein said bath, said second bath and said liquid curtain are arranged to maintain the interior of said enclosure in sterile condition while permitting empty cups and cover elements to enter said enclosure and filled and sealed cups to be discharged therefrom.

14. The apparatus according to claim 8 wherein said liquid sterilant is continuously circulated between said reservoir and said bath, and is passed through filter means to remove foreign matter.

15. The apparatus according to claim 1 wherein said endless belt conveyor means is arranged to become exposed to ambient atmosphere for a part of its run and to be sterilized prior to entering said enclosure by being immersed and advancing through said bath.

16. The apparatus according to claim 1 further including means for cooling the pre-sterilized food product to below ambient temperature prior to being filled into said cups.

* * * * *